United States Patent [19]

Logan, Jr.

[11] Patent Number: 5,030,472

[45] Date of Patent: Jul. 9, 1991

[54] SPIRALLY SLICED BONELESS MEAT PRODUCT

[76] Inventor: James P. Logan, Jr., Rte. 4, Box 94D, Richmond, Tex. 77469

[21] Appl. No.: 550,805

[22] Filed: Jul. 10, 1990

Related U.S. Application Data

[60] Continuation of Ser. No. 324,182, Mar. 16, 1989, abandoned, which is a division of Ser. No. 107,256, Oct. 9, 1987, Pat. No. 4,821,635, which is a continuation-in-part of Ser. No. 912,533, Sep. 29, 1986, abandoned, which is a continuation-in-part of Ser. No. 784,658, Oct. 5, 1985, abandoned.

[51] Int. Cl.[5] ............................................ A23L 1/31

[52] U.S. Cl. .................................... 426/641; 426/645

[58] Field of Search ............... 426/104, 641, 645, 420, 426/513

[56] References Cited

U.S. PATENT DOCUMENTS

| | | | |
|---|---|---|---|
| 2,599,328 | 6/1952 | Hoenselaar | 426/645 |
| 2,789,908 | 4/1957 | Doepken | 426/641 X |
| 3,153,436 | 10/1964 | Chesley | 99/538 |
| 4,332,190 | 6/1982 | Mart | 99/538 |
| 4,387,111 | 6/1983 | Mullender | 99/538 X |

FOREIGN PATENT DOCUMENTS

| | | | |
|---|---|---|---|
| 2581842 | 11/1986 | France | 426/645 |

*Primary Examiner*—Arthur L. Corbin

*Attorney, Agent, or Firm*—Pravel, Gambrell, Hewitt, Kimball & Krieger

[57] ABSTRACT

A boneless meat product, including hams and other boneless meat, the meat being spirally sliced around an axis through the meat. The axis is created by the insertion of a temporary support member through the meat. The meat is mounted in meat slicing apparatus which rotates the meat. A slicer blade is introduced into the meat in a plane substantially perpendicular to the axis of rotation while the meat is rotating. The slicer blade is then indexed linearly along an axis parallel to the axis of rotation of the meat, thereby effecting a spiral cut in the meat. The meat is removed from the apparatus following slicing operations and the support member removed from the meat.

4 Claims, 4 Drawing Sheets

SPIRALLY SLICED BONELESS MEAT PRODUCT

CROSS REFERENCE TO RELATED APPLICATIONS

This is a continuation of copending application Ser. No. 324,182, filed on Mar. 16, 1989, now abandoned, which is a divisional application of U.S. application, Ser. No. 107,256, filed Oct. 9, 1987, now U.S. Pat. No. 4,821,635 which is a continuation-in-part of U.S. application, Ser. No. 912,533, filed Sept. 29, 1986, now abandoned, which is a continuation-in-part of U.S. application, Ser. No. 784,658, filed Oct. 5, 1985, now abandoned.

BACKGROUND OF THE INVENTION

1. Field of the Invention

The present invention relates to an apparatus for the slicing of meat and, more particularly, to an apparatus for effecting a spiral slice cut in a ham, beef roast, or the like.

2. General Background

There exists a number of different apparatus for spiral slicing of meats, such as hams or roasts, about the bone located in the cut of meat. These devices have a number of common features. First, they typically include a rotating chuck assembly. The chuck assembly is driven by some motorized means and is designed to hold the meat to be cut, thereby rotating the meat about the chuck assembly rotational axis. Second, the device includes a rotating circular saw blade, disposed in a plane generally perpendicular to the rotational axis of the chuck assembly and including a means for driving the saw blade, for cutting the meat. To facilitate the mechanics of the cutting process, provisions are generally made for adjusting the position of the saw blade relative to the stated plane. Third, the device includes a means of gradually linearly indexing the saw blade assembly relative to the meat. The index axis is typically parallel to the chuck assembly rotational axis. Lastly, the saw blade assembly typically includes a means for rotating the saw blade about the index axis, thereby laterally positioning the saw blade and bringing the blade into cutting engagement with the meat. The rotation of the meat, when in contact with the saw blade, and the linear indexing of the blade relative to the meat, effect a generally continuous spiral cut of the meat about the bone. While the concept of the apparatus has been accepted, there persists a number of problems associated with existing devices, which will be described hereinafter.

One such device was set forth in U.S. Pat. No. 4,441,411, issued to Mullins. In this device, the saw blade assembly was vertically indexed relative to the meat by linking the saw blade assembly to a first hydraulic vertical drive cylinder. However, there were a number of problems with this type of hydraulic vertical indexing system.

First, prolonged use of the device increased the temperature of the hydraulic fluid and thereby caused a gradual fluid expansion. This gradual fluid expansion resulted in an undesired variation in the vertical indexing rate, which varied the cut from the desired thickness of the meat slices. Further, it is normal for conventional hydraulic systems to operate in the pressure range of 1000–2000 psi, where the Mullins device operates in the range of 50–60 psi. Prolonged use of the device resulted in wear in the seals and other elements of the hydraulic circuit, thereby causing variations of up to $\pm 10$ psi during the course of operation. These pressure variations also resulted in a non-uniform meat slice thickness.

Second, consistency in vertical positioning is important in a meat slicing operation. In the interest of safety, the slicing of meat is a man-attended operation. Commercial operations often call for the operator to be called away from the slicing operation for other tasks. Safety procedures call for the blade to be disengaged from the meat and the apparatus de-energized when the operator is away. Due to variations in fluid temperature and wear in hydraulic system components, the Mullins device often experienced a "bleed down" or leakage within the hydraulic system. The bleed down resulted in a variation in the height of the saw blade from the height at the time of interruption of operations. It was difficult for the operator to vertically re-index the saw blade to the position where disengagement occurred when resuming operations, which yielded a non-uniform cut.

A hydraulic cylinder linkage was also used in U.S. Pat. No. 4,441,411 to laterally position the saw blade into engagement with the meat. Herein, a second, horizontally disposed, hydraulic cylinder, operating in the same hydraulic system, was linked to the shaft linkage of the vertical indexing cylinder through an offset arm. Actuation of the second hydraulic cylinder caused the shaft linkage of the vertical indexing cylinder to rotate about the vertical indexing axis and laterally positioned the saw blade relative to the meat to be cut.

The problem with this arrangement is a peculiarity of the type of meat to be cut. The cuts of meat typically have a first bone, which is generally aligned with the rotational axis of the chuck assembly. Many of the cuts, such as picnic hams and the like, also have a second or "aitch" bone, which are offset and eccentrically positioned relative to the first bone. In order to properly effect a spiral cut, it is necessary for the saw blade to cut circumferentially about the first bone. However, the saw blade will come into contact with the eccentrically positioned aitch bone during the rotation of the meat, causing a destructive wearing of the saw blade and possible chipping of the aitch bone, thereby ruining the cut of meat.

This problem is generally addressed through the inclusion of an override handle attached to the saw blade assembly to permit the operator to withdraw the saw blade a sufficient distance to "ride" about the aitch bone. Because the aitch bone is not visible during the cutting operation, this technique requires the operator to acquire a "feel" for when the blade is in contact with the aitch bone, so as to manually override the engagement force of the second hydraulic cylinder. By feeling the resistance met by the saw blade, the operator is able to keep the saw blade in light contact with the bones in the meat as it rotates about the chuck assembly axis.

The problems with the hydraulic positioning system of U.S. Pat. No. 4,441,411 arose from the relative incompressibility of hydraulic fluid. First, it was difficult for the operator to determine when the saw blade is coming in contact with either the first or second bone. Where the operator was unable to feel the contact through the override handle, meat spoilage and blade breakdown could occur. Second, the amount of force required to overcome the engagement force supplied by the second hydraulic cylinder was excessive due to the relative incompressibility of the hydraulic fluid. A biasing spring within the second hydraulic was provided for in this device to help overcome fluid incompressibility; however, it too operated against fluid pressure. During the course of daily operations, an establishment utilizing this type of apparatus may cut an average of 10–15 hams per day, with peak days having as many as 60. Over an average day's operation, an operator may have been required to exert from 68 to 71 pounds of force over a distance of 4–6 inches to withdraw the blade a sufficient distance over the aitch bone. Further, the operator performed this manual override an average of 12–15 times per ham. Thus, during the course of an average day, the operator expended over 5000 ft-lbs during slicing operations. On peak days, this expenditure was as high as 25,200 ft-lbs. It will be appreciated that the amount of override work expended over a day's operation was highly fatiguing to the operator and could result in spoilage of meat due to miscuts.

Other embodiments of this type of apparatus varied the means by which each of the basic functions were carried out. U.S. Pat. No. 4,287,820 disclosed a clutch actuated, chain driven, carriage for vertically indexing the saw blade assembly. U.S. Pat. No. 4,332,190 utilized a gear-driven, threaded shaft to vertically index the saw blade assembly. One disadvantage common to both of the above devices was that the rate of vertical indexing was dependent upon the rotation rate of the chuck assembly. In U.S. Pat. No. 4,287,820, the relationship was determined by the gear which drove the vertical indexing carriage. In U.S. Pat. No. 4,332,190, the relationship was determined by a gear ratio and lead screw. Both of these devices could vary this relationship only upon changing either a lead screw or gear. This presented a significant disadvantage in commercial operations where slice thickness varied with customer demand.

A similar problem exists in U.S. Pat. No. 2,599,328 wherein the cutting rate was controlled by the rate of rotation. In this apparatus, the meat was rotated and simultaneously vertically indexed. Instead of using a circular saw blade, a reciprocating saw was used to cut the meat. The reciprocating saw was gear driven from the same motor which controlled the vertical indexing and rotation. The problem with this device was that the vertical indexing, meat rotation and saw speed were all interrelated. Slice thickness was varied by changing the vertical index lead screw; a time consuming operation.

Accordingly, a meat slicing apparatus is desired which does not suffer from the disadvantages of hydraulic systems and which provides a higher degree of selection of cutting thickness than that provided by strictly mechanical systems. The present invention is designed to overcome the above problems and also provides a method for spiral cutting boneless meats.

SUMMARY OF INVENTION

Briefly, the present invention provides a new and improved meat slicing apparatus, capable of effecting a spiral cut in hams or other meats, including boneless meats. The apparatus includes an electrically driven, rotating meat chuck assembly for holding the meat and rotating the meat about the rotational axis of the chuck assembly during cutting operations; a circular slicer blade generally disposed in a plane perpendicular to the chuck rotational axis for cutting the meat; an electrically driven, linear indexing system for moving the slicer blade along an axis parallel to the chuck rotational axis; a pneumatic positioning system for moving the slicer blade into cutting engagement with the meat; and a meat spit adapted to fit within the chuck assembly and provide structural support for boneless meats during cutting operations. The apparatus is also provided with a rotational stop which will limit blade engagement during boneless meat cutting operations.

The chuck assembly is designed to hold and rotate the meat during cutting operations. The chuck assembly is also designed to receive a meat spit, which is inserted into the assembly along the chuck assembly rotational axis. The meat spit is inserted into boneless cuts of meat and is designed to provide structural support for the meat during boneless cutting operations. The ability to spirally slice boneless meats does not appear in the prior art and represents a new commercial application for spiral slicing apparatus.

The linear indexing means include an electrically driven, threaded drive shaft, disposed along a linear index axis, parallel to the chuck rotational axis. The drive shaft rotates at a precisely controlled variable rate and direction in response to rotation of an electrical motor, wherein the motor direction and rate are controlled by an electrical motor controller. The rotation of the drive shaft is translated into motion along a linear index axis which in turn moves a blade rotator sleeve along the linear index axis. A slicer blade assembly is mounted on the first end of the blade rotator sleeve, the slicer assembly including a motor, blade support arm and a slicer blade which is pendently disposed on the first end of the blade, support arm in a plane generally perpendicular to both the chuck rotational axis and the linear index axis. The nature of the electrically driven threaded drive shaft is such that when the electrical motor is deactivated, the drive shaft and, therefore, the slicer assembly maintains linear position with respect to the meat. Thus, the slicer blade may be disengaged from the meat, power deactivated, and power later reactivated and the blade readily re-engaged at the same vertical position relative to the meat, thereby permitting a continuation of the spiral cut.

The blade positioning system is a pneumatically driven rotating system linked to the blade rotator sleeve, wherein activation of the pneumatic system causes the blade rotator sleeve to rotate about the linear index axis, so as to cause the slicer blade engage or disengage the meat. One embodiment of the pneumatic rotating system contemplate a dual pneumatic cylinder disposed in a plane perpendicular to the linear index axis. The pneumatic cylinder includes a cylinder rod which is linked to a sliding offset arm on the blade rotator sleeve, whereupon energizing a selected side of the pneumatic cylinder the sleeve will rotate in a clockwise or counterclockwise direction, thus engaging or disengaging the slicer blade in the meat. During boneless cutting operations, a split nut stop is threaded onto an externally threaded nut mounted on the face of the pneumatic cylinder. The stop limits rotation of the blade's rotator sleeve during boneless meat slicing operations, thereby limiting movement of the slicing blade to within ⅛ of an inch of the meat spit inserted into the meat as described above. The pneumatic positioning means, as a result of utilizing a relatively compressible fluid, permits the engagement force to be readily overcome, thereby preventing the blade from cutting into bones or joints in the meat which are located eccentric with respect to the chuck axis of rotation. The manual force required to overcome pneumatic force engagement during slicing opertions is in the range of 22-25 pounds. During commercial slicing operations, as described above, the operator expends 1,500 ft-lbs on an average day and 9,000 ft-lbs on a peak day as opposed to hydraulic system expenditures of 5,040 ft-lbs and 25,200 ft-lbs, respectively. This represents a significant labor saving during slicing operations.

DETAILED DESCRIPTION OF THE INVENTION

Figure 1:
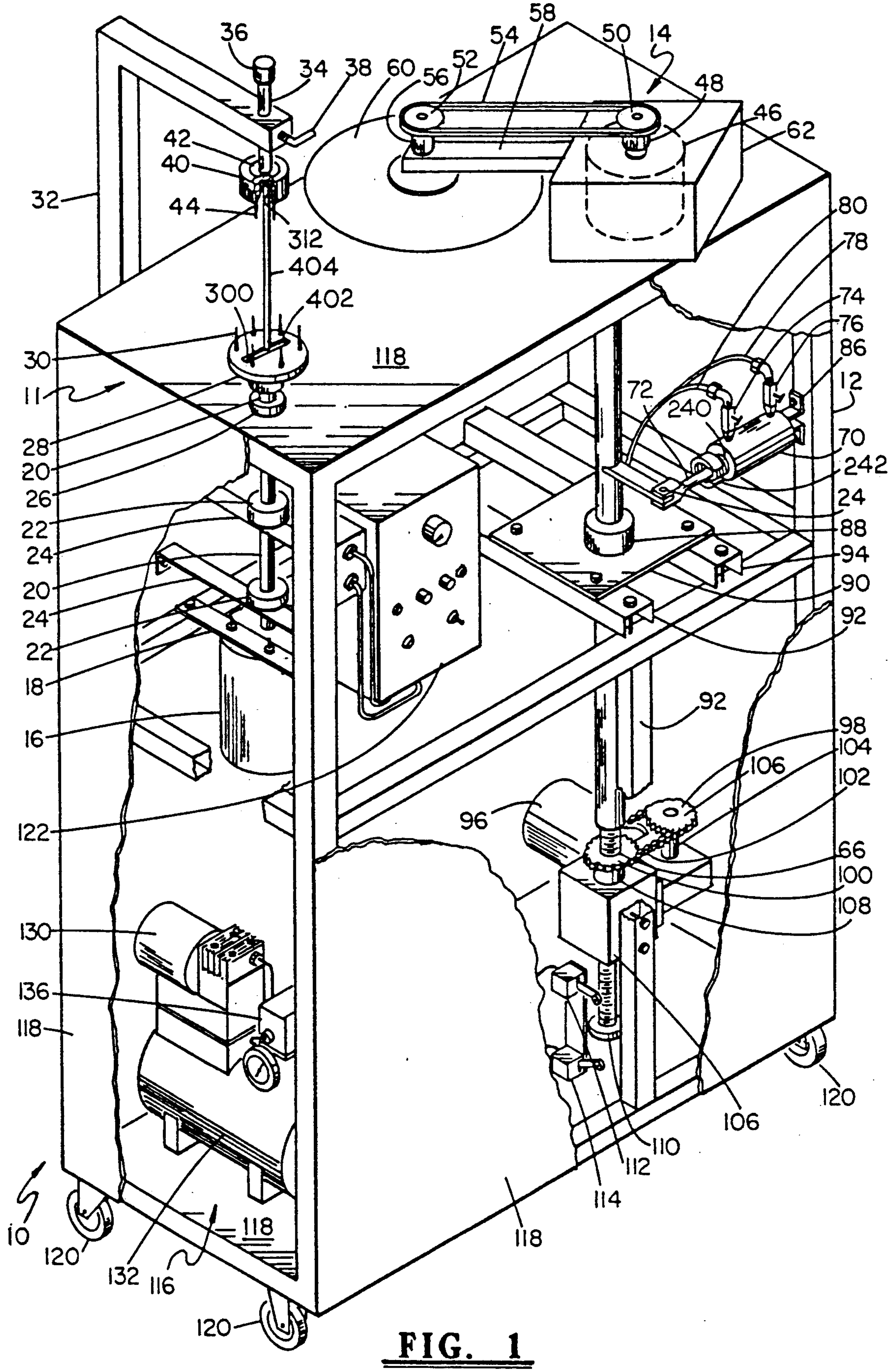
FIG. 1 is a pictorial illustration, partially in section, depicting the present invention.

Referring now to FIG. 1, there is depicted therein a meat slicing apparatus 10, which includes a meat chuck assembly 11, a pneumatic positioner assembly 13, a slicer assembly 14, linear indexing assembly 15 and a main frame 12 used to support the chuck and slicer assemblies 11 and 14 and other components of the apparatus.

Referring now to the main frame 12, shown in FIG. 1, the frame 12 is composed of a plurality of support beams 92 which form a base for the slicer assembly 10. The frame 12 includes a plurality of support beams which traverse the inner space defined by the frame 12, so as to provide support for various components described hereinafter. The frame further includes cover plates 118, which form a floor, top plate and side plates to the frame. Mounted internal of main frame 12 is an electrical control module, which provides a housing for a plurality of electrical components described hereinafter.

Referring now to the chuck assembly 11, shown in FIG. 1, having upper and lower assemblies. The upper chuck assembly includes a generally L-shaped support arm 32, which is connected to main frame 12. A chuck support shaft 34, having a stop 36 on its upper end, and a blind hole 312 therein on its lower end, extends through the support arm 32. A threaded chuck lock 38 extends through and is in threaded engagement with the end of chuck support arm 32 and may be rotated to be brought into contact with chuck support shaft 34 to prevent movement of chuck support shaft during operations. A bearing 42 is mounted on the other end of the support shaft and carries an upper chuck 40, having a plurality of spikes mounted perpendicular to the face of the chuck 40, to permit rotation of chuck 40. The upper chuck 40 includes a blind hole 312 extending through upper chuck 40 to receive the stem member 404 of meat spit 400.

The lower chuck assembly includes an electrical motor 16, which is mounted on frame 12 and support beams 92 within frame 12 by means of a motor mount 18. The chuck motor 16 includes a drive shaft 20 which extends through an upper plate 118 of the slicing apparatus 10. A bearing 26 is provided for on the upper plate 118 to reduce friction as the shaft 20 rotates. The motor shaft 20 is interconnected with the lower chuck 28, having a plurality of spikes aligned perpendicular to the face of lower chuck 28, and is in coaxial alignment with chucks 28 and 40, and chuck support shaft 34, thereby defining a chuck rotational axis. The lower chuck 28, having a slot 300 therein, is designed to receive tee member 402 of meat spit 400 in slot 300. The meat spit 400 is used in the slicing of boneless meats to provide support by inserting stem member 404 into the meat during slicing operations. Upon activation of motor 16, the lower chuck 28 is caused to rotate by drive shaft 20, thereby rotating any meat disposed between chucks 28 and 40 about the chuck rotational axis.

Figure 4:
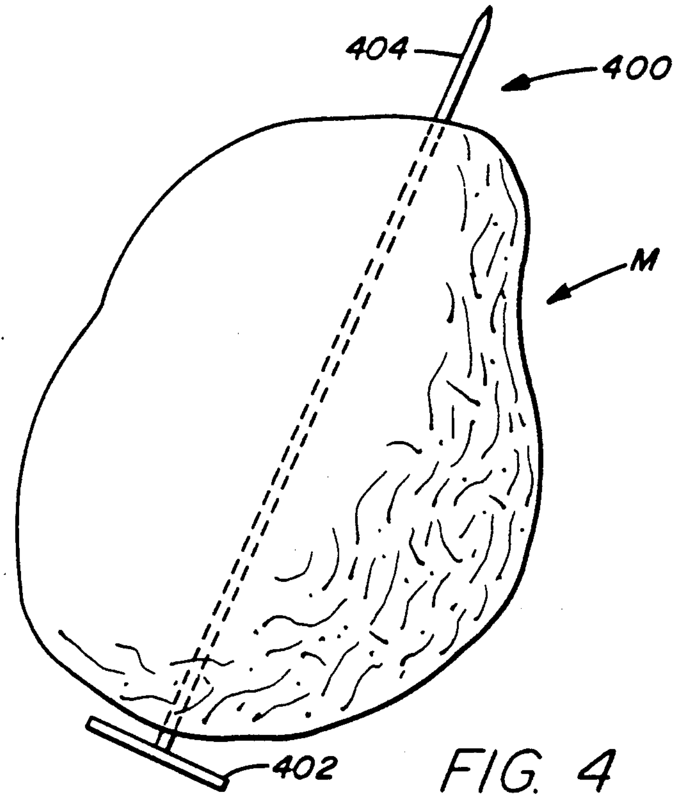
FIG. 4 is a pictorial representation of a boneless meat product prior to the commencement of spiral slicing operations."

FIG. 4 depicts a boneless meat product having meat spit 400 inserted therein. The stem member 404 of spit 400 forms an axis through the meat M for slicing operations.

Referring now to the slicer assembly 14 in FIG. 1, a circular slicer blade 60, having a blade shaft 56 and a blade pulley 52, is disposed in a plane generally perpendicular to the chuck rotational axis. The blade shaft 56 is interconnected to a blade support arm 58, which is in turn connected to a slicer motor housing 62, in a manner to permit the blade shaft to rotate, thereby permitting the circular slicer blade 60 to also rotate. An electrical motor 46, having a motor drive shaft 48 and motor pulley 50, is mounted within the slicer motor housing 62 with the drive shaft 48 essentially parallel with the chuck rotational axis. A belt 54 is routed between the blade pulley 52 and motor pulley 50, such that activation of motor 46 will rotate motor pulley 50 and transmit the rotation to blade pulley 52, thereby causing circular slicer blade 60 to rotate.

Still referring to FIG. 1, the linear indexing assembly 15 is used to move the slicer blade assembly 14 parallel to the axis of the rotation of the chuck assembly 11. An electrical indexing motor 96 is mounted on the main frame 12 of the slicing apparatus 10. A motor drive shaft 104 and sprocket member 98 are connected to the indexing motor 96 and aligned parallel to the chuck assembly 11 axis of rotation. A threaded indexing shaft 66 extends through a sprocket support bearing 108, also along an axis parallel to chuck assembly 11 axis of rotation. The sprocket support bearing 108 is mounted on a sprocket support housing 106, which is in turn mounted on main frame 12. The sprocket support bearing 108 is also threaded through a second drive sprocket 100. Drive sprockets 100 and 98 are interconnected by a drive chain 102. A limit switch trip plate 110 is mounted on the lower end of the threaded shaft 66. Energization of motor 96 will cause motor drive shaft 104 and sprocket 98 to rotate, imparting rotation to sprocket 100 by means of drive chain 102. The rotation of sprocket 100 in turn rotates sprocket support bearing 108, the rotation thereby causing threaded shaft 66 to move in a linear direction dependent upon the direction of motor rotation, parallel to the chuck assembly 11 rotation axis. An upper limit switch 112 and a lower limit switch 114 are disposed about switch trip plate 110 in a position corresponding to the corresponding desired upper and lower indexing positions. Switch plate 110 coming in contact with either limit switch 112 or 114 will result in the de-energization of index drive motor 96, thereby preventing any further linear motion.

Figure 3:
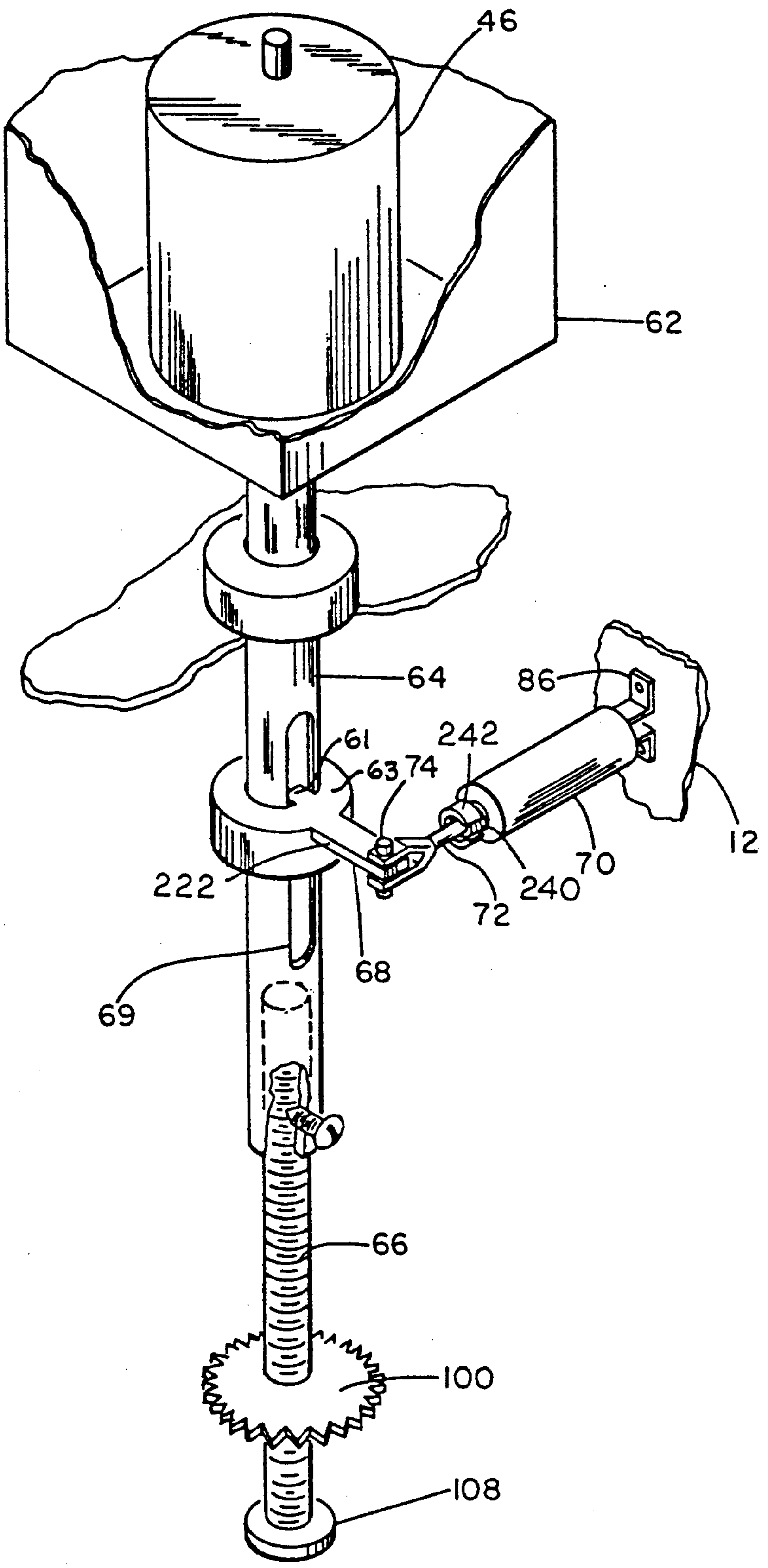
FIG. 3 is an illustration of the interaction between the threaded drive shaft, rotator sleeve and pneumatic cylinder of the present invention.

Still referring to linear indexing assembly 15, shown in FIG. 1, a bearing support plate 90 is mounted within main frame 12, in a plane perpendicular to the motion of threaded shaft 66, by means of a plurality of support beams 92. The bearing support plate 90 in turn carries a pillow block bearing 88, through which is extended a blade rotator sleeve 64, having a slot 69 therein, as shown in FIG. 3. One end of the blade rotator sleeve 64 is interconnected to slicer blade assembly 11 by connecting blade rotator sleeve 64 to slicer motor housing 62 in a suitable fashion. The other end of rotator sleeve 64 is interconnected to threaded drive shaft 66. The linear motion of threaded shaft 66 is transmitted through blade rotator sleeve 64, thereby causing the slicer blade assembly 14 to move along an axis parallel to chuck assembly 11, in a direction dependent on the direction of rotation of drive motor 96.

Figure 2:
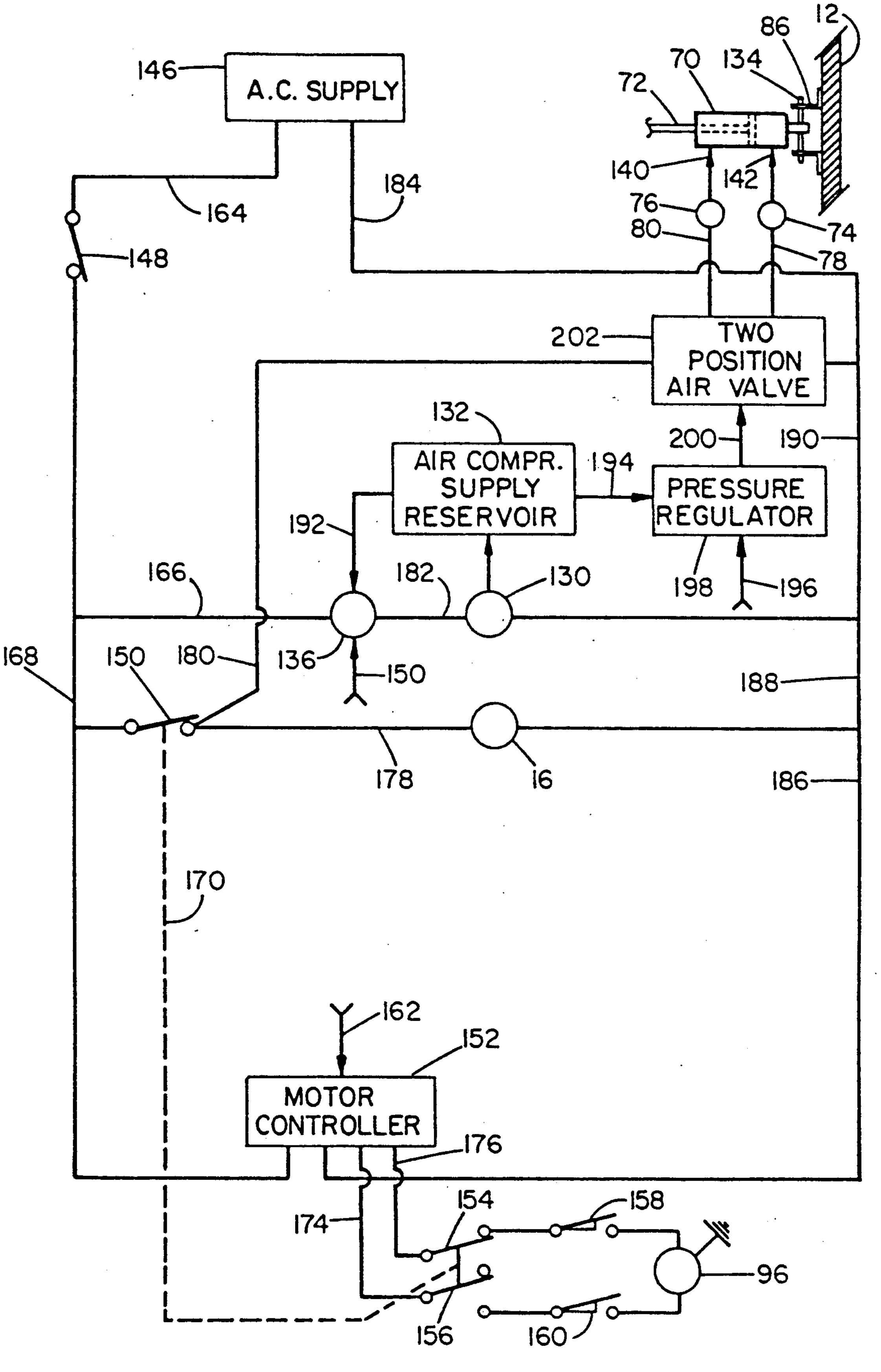
FIG. 2 is a schematic of the electrical and pneumatic systems of the present invention.

A pneumatic positioner assembly 13 is also shown in FIG. 1. A dual chamber pneumatic cylinder 70, having a cylinder rod 72, is mounted on main frame 12 by means of a bracket 86, in a plane perpendicular to the linear movement of threaded shaft 66. The cylinder rod 72 is connected by a pin 74 to a blade rotator arm 220. The blade rotator arm 220 includes a body 63, an offset arm 222 and a tongue 61, and fits over the blade rotator sleeve 64, as more clearly shown in FIG. 3. A pair of pneumatic supply hoses 78 and 80 are connected to pneumatic cylinder 70 through a pair of valves 76 and 74, respectively. Mounted on floor 118 of main frame 12, is an air compressor assembly 116, consisting of a compressor motor 130, an air reservoir 132, and an air compressor switch 136. The supply hoses 78 and 80 are connected to air reservoir 132 by means of a two position air valve 232 and air pressure regulator 230, as more clearly shown in FIG. 2. The energization of pneumatic cylinder 70, through supply line 78 and air valve 76 causes cylinder rod 72 to move in an outward direction, thereby imparting a clockwise rotation, about the axis of linear motion, to the rotator arm 220, which in turn transmits the rotational motion to blade rotator sleeve 64 and slicer blade assembly 14, which will move the slicer blade 60 away from any meat disposed in the chuck assembly 11. Conversely, energization of pneumatic cylinder 70 through supply line 80 and air valve 74 will cause the cylinder rod 72 to retract into the pneumatic cylinder 70, thereby imparting a counterclockwise rotation, about the axis of linear motion, to the rotator arm 220, which in turn transmits the rotational motion to the blade rotator sleeve 64 and slicer blade assembly 14 which will move the slicer blade 60 toward any meat disposed in the chuck assembly 11.

The pneumatic cylinder 70 is provided with an externally threaded nut 240, which is affixed to the face of cylinder 70 and coaxially aligned with cylinder rod 72. The threaded nut 240 may be attached to the face of the pneumatic cylinder 70 by spot welding or other means. A split nut 242 is also provided as shown in FIG. 3, which permits the split nut to be positioned around cylinder rod 72 and threadedly engage the threaded nut 240. The split nut stop 242, therefore, limits movement of the offset arm 222, which in turn, limits the rotational movement of the slicer assembly 14. The split nut 242 is mounted on pneumatic cylinder 70 during boneless slicing operations and is designed to restrict the lateral motion of the slicer assembly 14, such that the slicer blade 60 is restricted to moving within $\frac{1}{8}$ of an inch of the meat spit 400.

Figure 5:
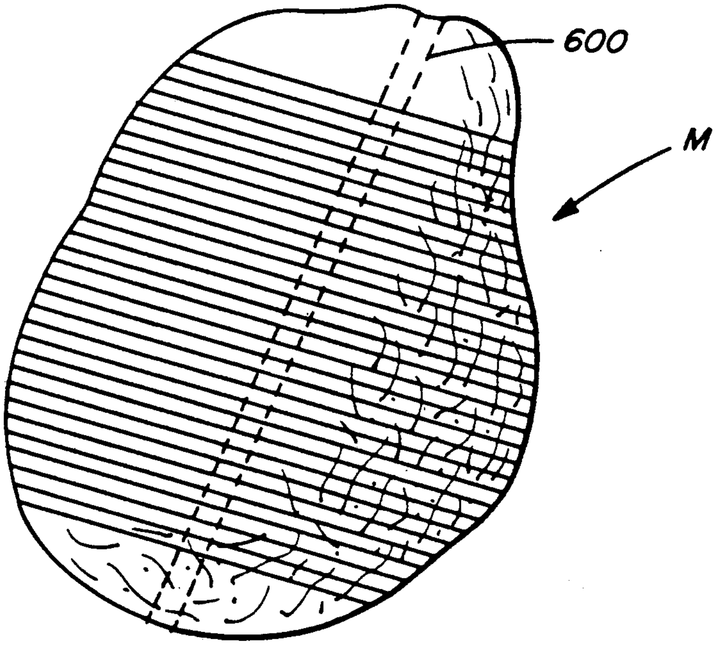
FIG. 5 is a pictorial representation of a spirally sliced boneless meat product.

FIG. 5 depicts a spirally sliced boneless meat product M, having spit 400 removed following spiral slicing operations. A central core of uncut meat 600 runs through the meat, thus permitting the meat to retain its shape.

Referring to FIG. 1, it will be appreciated that at times, it is desirable to manually override the force which brings slicer blade 60 into engagement within the meat held between chucks 28 and 40 as, for example, when the eccentrically-oriented aitch bone within the meat traverses about the chuck rotational axis. When the meat has rotated to the location where the eccentrically-oriented bone will come in contact with slicer blade 60, blade support arm 58 may be moved slightly in a clockwise direction so as to override the force introduced by rode 72, causing blade 60 to otherwise move towards the meat. It is a feature of the present invention that the force bringing slicer blade 60 towards the meat is provided by pneumatic pressure within the cylinder housing 70 as opposed to hydraulic pressure of a relatively incompressible fluid.

Accordingly, the force required to overcome the force provided by cylinder rod 72 is greatly reduced as the operator is forcing the piston within housing 70 in a direction toward the high pressure side of the piston, thus compressing the air within the cylinder housing 70. In this manner, operator fatigue is reduced, and enabling the operator to cause the blade 60 to gently ride over the outer circumference of the aitch bone so as to avoid severing of the bone or joint and ruining the meat cut. Moreover, the utilization of pneumatic force in moving slicer blade 60 towards meat, the operator may be more readily capable of sensing or feeling through blade 60 and support arm 58 the relative position of the outer circumference of the bone or joint as it rotates about the chuck assembly rotational axis. This is in contrast to the prior apparatus using a relatively incompressible or liquid hydraulic fluid drive.

It will be appreciated that it is generally desirable for slicer blade 60 to maintain slight engagement or to be substantially close to the outer circumference of the bone so as to provide slicing of the meat all of the way to the bone and that as the meat rotates, the distance between the outer circumference of the bone facing slicer blade 60 and slicer blade 60 would otherwise vary due the eccentricity of the bone if slicer blade 60 were to remain stationery. The movement of slicer blade 60 towards and away from the meat is necessary during slicing operations to compensate for this eccentricity and to maintain slicer blade 60 in light contact with or in close proximity to this outer circumference of the bone. Thus, during normal slicing operations, slicer blade 60 will move outwards away from the meat and inwards toward the meat once per revolution of the meat. In prior hydraulic systems, wherein the operator had to provide such outward movement of slicer blade 60 by force against a hydraulic system, this was quite tiresome. Moreover, due to the relative lack of compressibility of hydraulic fluid, hydraulic systems or circuit leakage was the only means available for providing some movement or give in the movement of slicer blade 60 by manual override which was generally insufficiently slight and cause undo work for the operator over a plurality of slicing operations. However, with the present invention, the force provided by the cylinder housing 70 to bring slicer blade 60 towards the meat may be overcome much more easily inasmuch as air or some other pneumatic fluid is being compressed by the operator by the movement of support arm 58 away from the meat. Moreover, inasmuch as more "give" is afforded by a pneumatic cylinder rather than a hydraulic one, the operator is much more readily able to cause blade 60 to maintain a very light engagement with the outer circumference of the bone or joint of the meat.

The manner in which the slicer assembly 14 is gradually indexed upwards and downwards during the slicing operation to provide the desired spiral slicing will now be described in greater detail with reference to FIG. 3. A more detailed view of the blade rotator sleeve 64 as shown in FIG. 3, reveals that a slot 69 provided therein. Also, in the embodiment shown in FIG. 3, a sleeve offset arm 222 may include a torroidal shape slide member 63 circumscribing the outer surface of the rotator sleeve 64 and having a tongue portion 61 extending into the vertically aligned slot 69. In this manner, the rotator sleeve 64 is permitted to move vertically with the respect to offset arm 222. However, due to tongue 61 of torroid member 63 extending into slot 69, upon actuation of the piston within cylinder housing 70, the stroke of cylinder rod 72 may be transmitted through pin 74 to offset arm 222 so as to cause rotation of the rotator sleeve 64 about the linear indexing axis in the desired direction. Therefore, the linear movement of rod 72 is transmitted through pin 74 to the offset arm 222 and converted into torque delivered by the tongue of 61 of the torroidal member 63 to rotator sleeve 64.

Still referring to FIG. 3, rotator sleeve 64 is also desirably hollow and has an internal thread which receives the outer threads of shaft 66. Alternatively, a set screw may be provided extended through the wall of rotator sleeve 64 which follows the outer thread of shaft 66. In other of these manners, upon rotation of shaft 66 about the linear index axis by means of aforementioned sprocket drive assembly including sprockets 98, 100, and drive chain 102, as shown in FIG. 1, this rotation will be imparted to the rotator sleeve 64 so as to move the sleeve upwards and downwards gradually. Moreover, the sleeve 64 will be preferably interconnected to the motor housing 62 through appropriate bearings such as pillow block bearing 88 and like bearings which may be provided between the upper cover 118 and the lower portions of the motor housing 62. In this manner, as shaft 66 indexes in response to rotation of motor 96, the motor housing 62 and slicer assembly 14 may be raised upwards or downwards in a gradual linear indexing fashion at a rate controlled by the speed of motor 96. Thus, it will be appreciated that the relative rotational rate of chuck assembly 11 in relation to the linear movement rate of slicer assembly 60 will regulate the thickness of slices of the meat. Moreover, because the vertical movement of rotator sleeve 64 is controlled by direct drive from motor 96 and a mechanical linkage therefrom, the rotator sleeve 64 and ultimately slicer blade 60 will remain indefinitely in the vertical position they were in prior to de-energizing motor 96.

To summarize the operation of the present invention, a meat spit is inserted in the meat to be cut and fitted into upper and lower chucks 40 and 28. The meat is then positioned between chucks 28 and 40, with the tee member 402 of spit 400 positioned in slot 300 and the stem member 404, in blind hole 312. A split nut 242 is fitted over cylinder rod 72 and threaded onto externally threaded nut 240 which is on the fact of the cylinder housing 70, thereby limiting the movement of cylinder rod 72 to prevent slicer blade 60 from coming into engagement with meat spit 400. The meat is disposed between chucks 28 and 40 and held by the plurality of spikes located thereon. The meat is then rotated about the chuck assembly axis by means of electrical motor 16 which is in turn controlled by motor controller 152. The slicer assembly 14 and slicer blade 60 are caused to index in a vertical fashion upon energization of motor 96 which in turn drives shaft 66 through sprockets 98, 100 and drive chain 102. The slicer blade is brought into engagement with the meat by energization of pneumatic cylinder 70 through line 142 causing cylinder rod 72 to linearly index and apply torque to blade rotator shaft 64 by means of blade rotator arm 220 and pin 74. The rotation of meat in chuck assembly 11 and the linear indexing of the slicer assembly 14, thereby effect a spiral cut on the meat disposed in the chuck assembly 11. The engagement force provided by means of pneumatic cylinder 70 may be overcome readily by means of a handle connected to blade support arm 58. Upon de-energization of the slicer assembly 1 will maintain its relative vertical position prior to de-energization. Slicing operations may be recommenced with the slicer assembly 1 maintaining the same position and reengaging the meat to maintain the same spiral cut.

It is therefore apparent that the present invention is adapted to obtain all of the advantages and features hereinabove set forth. It will be understood that certain combinations and subcombinations are futility and may be employed without reference to other features and subcombinations. Moreover the foregoing disclosure and description of the invention are illustrative and explanatory thereof are not designed to be limiting as to the scope of the present invention.

I claim:

1. A boneless sliced meat having its meat arranged in the form of a continuous spiral cut about an axis of the meat, the axis being created by the temporary insertion of a support member in the meat.

2. A boneless sliced meat having its meat arranged in the form of a continuous spiral about an uncut central core of meat.

3. A boneless sliced ham having its meat arranged in the form of a continuous spiral cut about an axis of the meat, the axis being created by the temporary insertion of a support member in the meat.

4. A boneless sliced ham having its meat arranged in the form of a continuous spiral about an uncut central core of meat.

* * * * *

US005030472A

REEXAMINATION CERTIFICATE (2537th)

United States Patent [19]

[11] B1 5,030,472

[45] Certificate Issued Apr. 11, 1995

Logan, Jr.

[54] SPIRALLY SLICED BONELESS MEAT PRODUCT

[76] Inventor: James P. Logan, Jr., Rte. 4, Box 94D, Richmond, Tex. 77469

Reexamination Request:
No. 90/002,661, Mar. 2, 1992

Reexamination Certificate for:

| | |
|---|---|
| Patent No.: | **5,030,472** |
| Issued: | **Jul. 9, 1991** |
| Appl. No.: | **550,805** |
| Filed: | **Jul. 10, 1990** |

Related U.S. Application Data

[60] Continuation of Ser. No. 324,182, Mar. 16, 1989, abandoned, which is a continuation-in-part of Ser. No. 107,256, Oct. 9, 1987, Pat. No. 4,821,635, which is a continuation-in-part of Ser. No. 912,533, Sep. 29, 1986, abandoned, which is a division of Ser. No. 784,658, Oct. 5, 1985, abandoned.

[51] Int. Cl.[6] .................................................. A23L 1/31

[52] U.S. Cl. ...................................... 426/641; 426/645

[58] Field of Search ............... 426/104, 641, 645, 420, 426/513; 99/538

[56] References Cited

U.S. PATENT DOCUMENTS 4,386,560 6/1983 Ditty et al. ............................ 99/538

*Primary Examiner*—Arthur L. Corbin

[57] ABSTRACT

A boneless meat product, including hams and other boneless meat, the meat being spirally sliced around an axis through the meat. The axis is created by the insertion of a temporary support member through the meat. The meat is mounted in meat slicing apparatus which rotates the meat. A slicer blade is introduced into the meat in a plane substantially perpendicular to the axis of rotation while the meat is rotating. The slicer blade is then indexed linearly along an axis parallel to the axis of rotation of the meat, thereby effecting a spiral cut in the meat. The meat is removed from the apparatus following slicing operations and the support member removed from the meat.

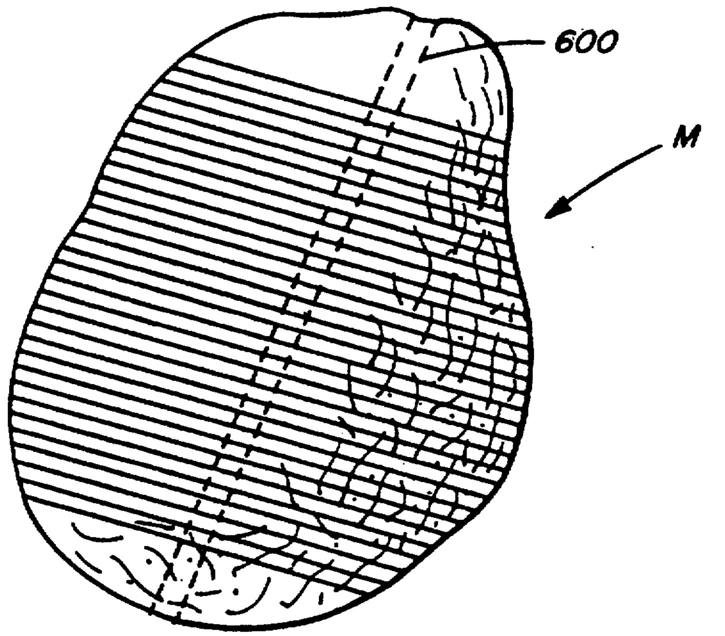

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claims 2, 3 and 4 are determined to be patentable as amended.

New claims 5–10 are added and determined to be patentable.

2. A boneless sliced meat having its meat arranged in the form of a continuous spiral about an uncut central *annular* core of meat, *where a support member is inserted through the annular core prior to slicing the meat and removed from the core after the meat is sliced.*

3. A boneless sliced ham having its meat arranged in the form of a continuous spiral cut about an axis of the [meat] *ham*, the axis being created by the temporary insertion of a support member in the [meat] *ham.*

4. A boneless sliced ham having its meat arranged in the form of a continuous spiral about an uncut central *annular* core of [meat] *ham, where a support member is inserted through the annular core prior to slicing the ham and removed from the core after the ham is sliced.*

*5. A boneless sliced meat product having its meat arranged in the form of a continuous spiral integrally connected to an uncut central core of meat, said product being made by the process of inserting a temporary support member through the meat product, rotating the meat product around the axis of the support member, moving a blade into the meat product adjacent one end of the support member, with the blade lying in a plane substantially perpendicular to the longitudinal axis of the support member, moving the blade along an axis parallel to the axis of rotation of the support member to produce a spiral cut in the meat, limiting the depth of the cut to leave a central core of uncut meat around the support member, and, after slicing, removing the temporary support member.*

*6. The meat product of claim 5 in which the meat is a ham.*

*7. A boneless sliced meat having its meat arranged in the form of a continuous spiral about an uncut central annular integral core of meat, said core having a wall thickness when cut of one-eighth of one inch.*

*8. A boneless sliced ham having its meat arranged in the form of a continuous spiral cut about an uncut central core of ham, the core being created by temporarily inserting a spit in the ham and slicing the ham along a spiral path to within one-eighth inch of the spit.*

*9. A boneless sliced meat having its meat arranged in the form of a continuous spiral cut about an uncut core of meat, the core being created by the temporary insertion of a spit in the meat and slicing the meat along a spiral path to within one-eighth inch of the spit.*

*10. A boneless sliced meat product having its meat arranged in the form of a continuous spiral integrally connected to an uncut central annular core of meat, said product being made by the process of inserting a temporary support member through the meat product, rotating the meat product around the axis of the support member, moving a blade into the meat product adjacent one end of the support member, with the blade lying in a plane substantially perpendicular to the longitudinal axis of the support member, moving the blade along an axis parallel to the axis of rotation of the support member to produce a spiral cut in the meat, limiting the depth of the cut to leave a central annular core of uncut meat with a wall thickness of about one-eighth of one inch around the support member, and, after slicing, removing the temporary support member.*

* * * * *